US008768384B1

(12) United States Patent
Vargantwar et al.

(10) Patent No.: US 8,768,384 B1
(45) Date of Patent: Jul. 1, 2014

(54) METHODS AND DEVICES FOR EFFICIENT USE OF MULTIPLE PAGING CHANNELS

(75) Inventors: Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 652 days.

(21) Appl. No.: 12/703,467

(22) Filed: Feb. 10, 2010

(51) Int. Cl.
*H04B 7/00* (2006.01)
*H04W 74/00* (2009.01)
*G08C 17/00* (2006.01)
*G06F 1/32* (2006.01)
*H04W 52/02* (2009.01)
*H04W 68/02* (2009.01)

(52) U.S. Cl.
CPC ............ *H04W 52/028* (2013.01); *H04W 68/02* (2013.01); *H04W 52/0229* (2013.01)
USPC ........... 455/458; 455/522; 455/455; 370/311; 713/320

(58) Field of Classification Search
CPC .......... H04W 52/0232; H04W 88/182; H04W 88/04–88/06; H04W 52/028; H04W 52/0229; H04W 52/0216; H04W 52/0261; H04W 52/0219; H04W 68/00; H04W 68/02; H04W 68/005; H04W 68/042; H04W 68/025; H04W 68/08
USPC .......... 370/311, 329, 328; 455/434, 450, 455, 455/458, 574, 522, 343.2; 713/320
See application file for complete search history.

(56) References Cited

U.S. PATENT DOCUMENTS

| 5,737,703 | A | 4/1998 | Byrne |
| 5,774,461 | A | 6/1998 | Hyden et al. |
| 5,898,679 | A | 4/1999 | Brederveld et al. |
| 5,907,540 | A | 5/1999 | Hayashi |
| 6,111,865 | A | * 8/2000 | Butler et al. ................ 370/335 |
| 6,115,762 | A | 9/2000 | Bell et al. |
| 6,205,495 | B1 | 3/2001 | Gilber et al. |
| 6,292,747 | B1 | 9/2001 | Amro et al. |
| 6,307,846 | B1 | 10/2001 | Willey |
| 6,327,254 | B1 | 12/2001 | Ghuah |
| 6,330,244 | B1 | 12/2001 | Swartz et al. |
| 6,438,117 | B1 | 8/2002 | Grilli et al. |
| 6,650,912 | B2 | 11/2003 | Chen et al. |
| 6,680,923 | B1 | 1/2004 | Leon |
| 6,687,285 | B1 | 2/2004 | Jou |
| 6,895,058 | B2 | 5/2005 | Abrishamkar et al. |
| 6,980,820 | B2 * | 12/2005 | Sinnarajah et al. .......... 455/515 |

(Continued)

OTHER PUBLICATIONS

Internet Engineering Task Force ("IETF") Request for Comments ("RFCs") 768, "User Datagram Protocol," J. Postel, Aug. 1980.

(Continued)

*Primary Examiner* — Nizar Sivji

(57) ABSTRACT

Methods and systems for efficiently using multiple paging channels in a wireless communication network are proposed. In particular, a radio access network (RAN) may determine that a wireless communication device (WCD), such as a cell phone, has not been responding to paging messages transmitted on a secondary paging channel. In response to this determination, the RAN may instruct the WCD to listen only to a primary paging channel, while the RAN will only use the primary paging channel to page the WCD. This, in turn, may increase the likelihood that the WCD is able to properly receive and respond to paging messages, and reduce the power consumption and battery drain of neighboring WCDs.

16 Claims, 6 Drawing Sheets

(56) References Cited

U.S. PATENT DOCUMENTS

| | | | |
|---|---|---|---|
| 7,167,458 B2* | 1/2007 | Agashe et al. | 370/329 |
| 7,193,987 B2 | 3/2007 | Vilander | |
| 7,376,091 B1 | 5/2008 | Eccles et al. | |
| 7,386,030 B2* | 6/2008 | Asghar et al. | 375/142 |
| 7,408,948 B2 | 8/2008 | Lopponen et al. | |
| 8,160,618 B2* | 4/2012 | Harris | 455/458 |
| 2001/0036830 A1 | 11/2001 | Wu et al. | |
| 2003/0091021 A1 | 5/2003 | Trossen et al. | |
| 2004/0236850 A1 | 11/2004 | Krumm et al. | |
| 2005/0085253 A1 | 4/2005 | Mansour | |
| 2006/0040681 A1 | 2/2006 | Julka et al. | |
| 2008/0070596 A1* | 3/2008 | Willey | 455/458 |
| 2008/0096585 A1 | 4/2008 | Willey | |
| 2008/0293438 A1* | 11/2008 | Harris | 455/458 |
| 2009/0221261 A1* | 9/2009 | Soliman | 455/343.2 |
| 2012/0122511 A1* | 5/2012 | Antonio et al. | 455/522 |

OTHER PUBLICATIONS

Internet Engineering Task Force ("IETF") Request for Comments ("RFCs") 791, "Internet Protocol DARPA Internet Program Protocol Specification," Information Sciences Institute, Sep. 1981.
Internet Engineering Task Force ("IETF") Request for Comments ("RFCs") 793, "Transmission Control Protocol DARPA Internet Program Protocol Specification," Information Sciences Institute, Sep. 1981.
C. Perkins, "IP Mobility Support," Network Working Group, Request for Comments: 2002, Oct. 1996.
C. Perkins, "IP Encapsulation within IP," Network Working Group, Request for Comments: 2003, Oct. 1996.
C. Perkins, "Minimal Encapsulation within IP," Network Working Group, Request for Comments: 2004, Oct. 1996.
J. Solomon, "Applicability Statement for IP Mobility Support," Network Working Group, Request for Comments: 2005, Oct. 1996.
Sutherland, "802.11 Insights: 802.11b and 3G Synergies for 2002," 802.11 Planet, http://www.80211-planet.com/columns/article/0,4000,1781_950811,00.html, printed Feb. 22, 2002.
"E-200 Cassiopeia Pocket Pc 2002," Casio, http://www.casio.com/personalpcs/products.cfm? section=19&product=4146, printed Feb. 22, 2002.
Choi, "Making Notebooks Truly Mobile," Techtv, http://www.techtv.com/freshgear/products/story/0,23008,3347281,00.html, printed Feb. 25, 2002.
"Product Description," WeRoam, http://www.weroam.com/, printed Feb. 25, 2002.
"Roaming Between WLAN and GSM Networks to Become Easier," thinkmobile, http://www.thinkmobile.com/laptops/news/00/48/33/, printed Feb. 25, 2002.
U.S. Appl. No. 11/455,602, filed Jun. 19, 2006.
U.S. Appl. No. 11/393,058, filed Mar. 30, 2006.
Office Action from U.S. Appl. No. 11/393,058, dated Jan. 21, 2009.

* cited by examiner

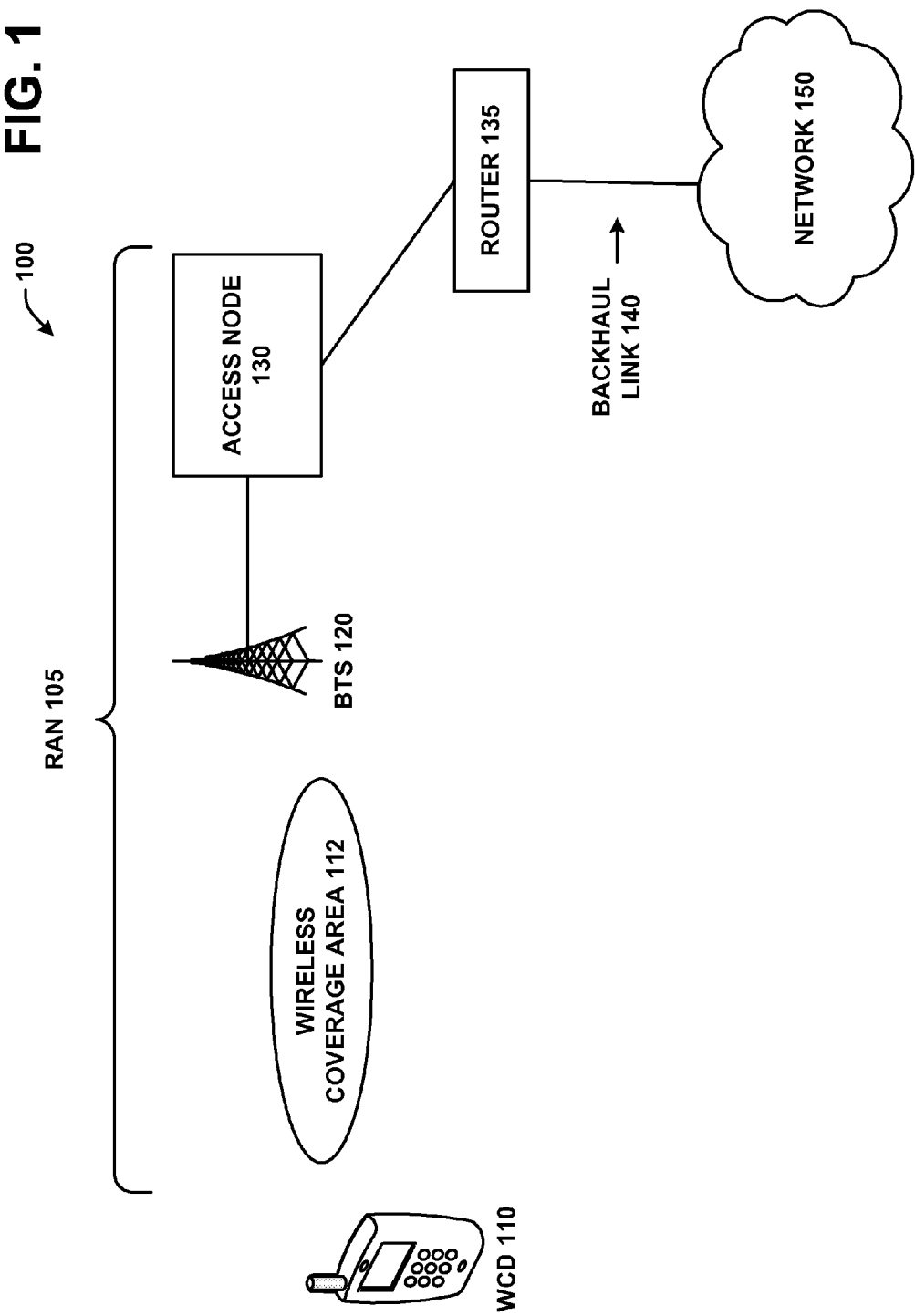

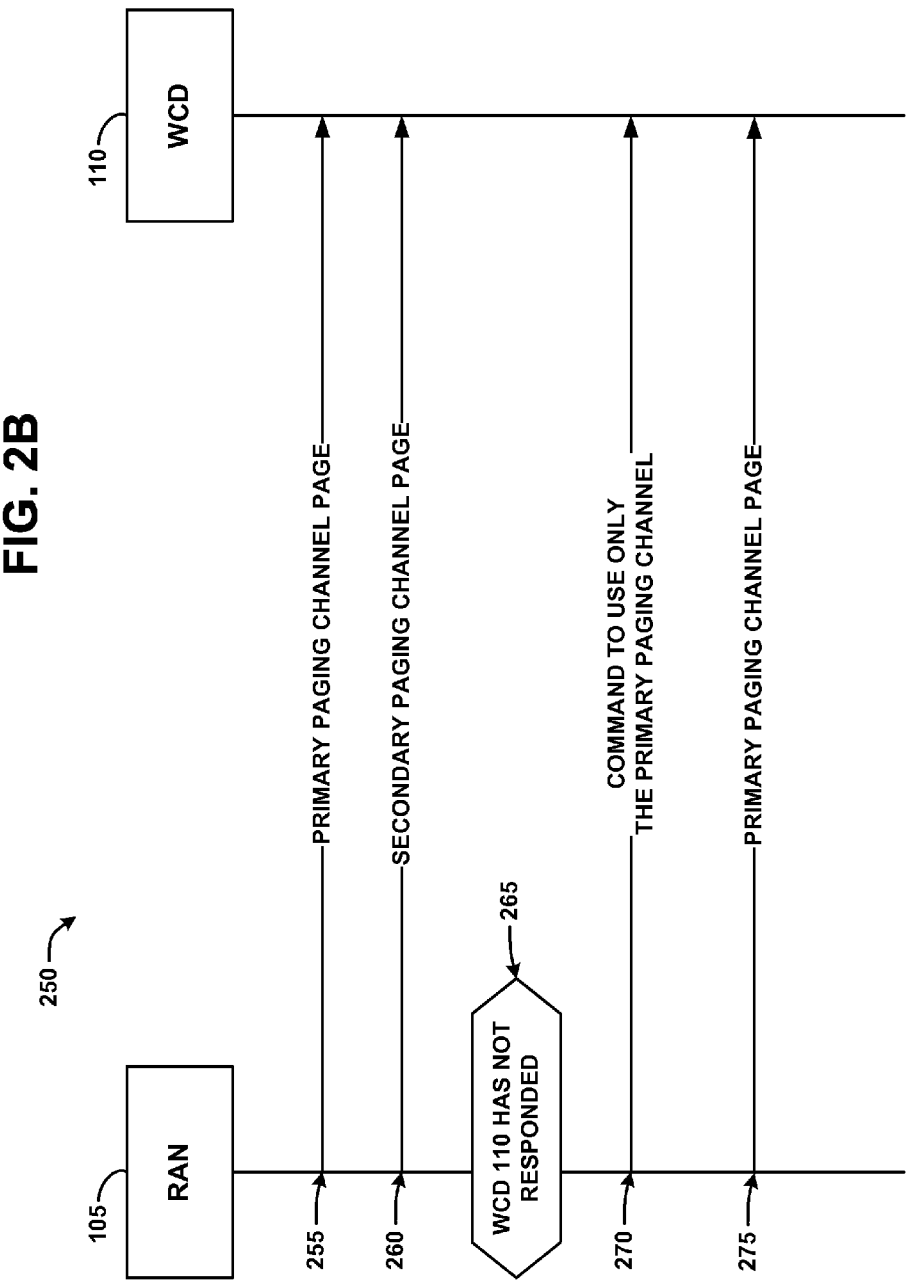

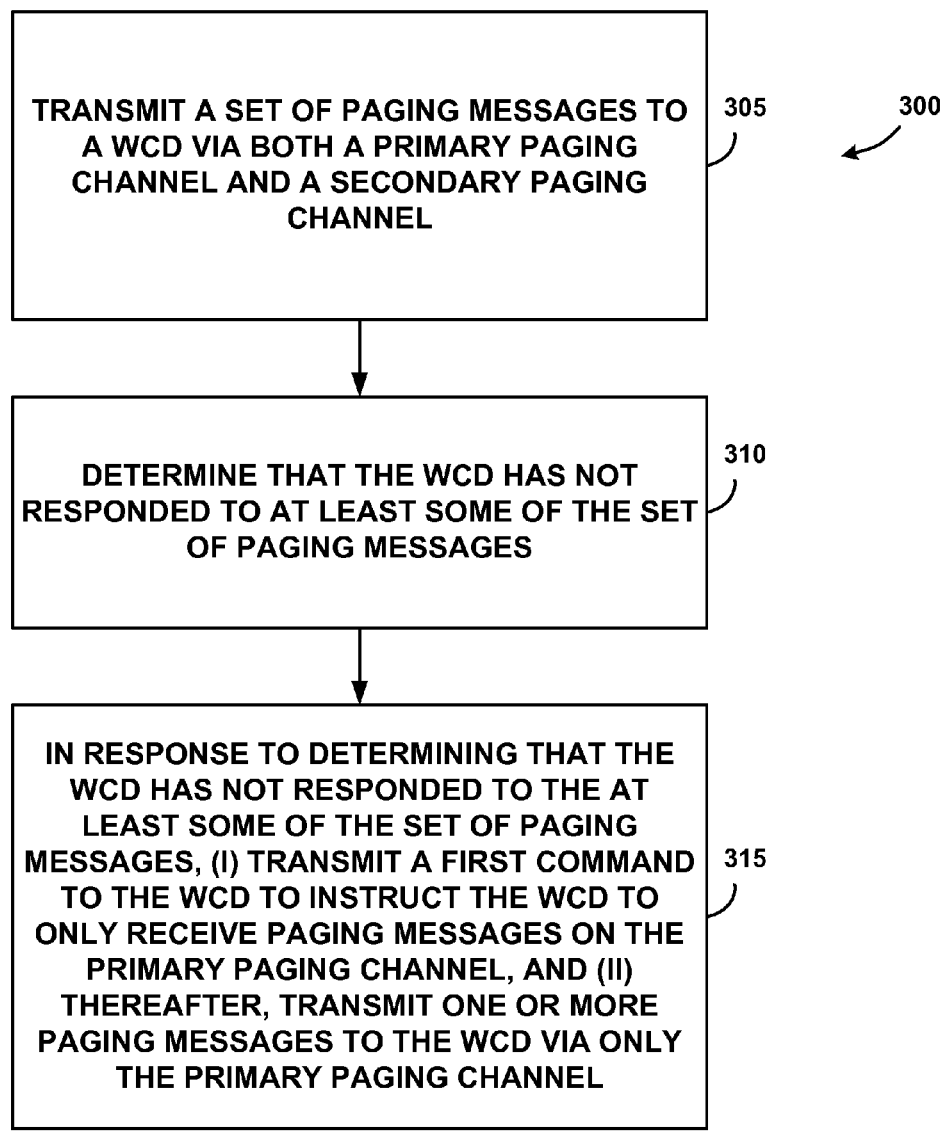

METHODS AND DEVICES FOR EFFICIENT USE OF MULTIPLE PAGING CHANNELS

BACKGROUND

Wireless communication devices (WCDs) utilize wireless coverage areas, defined by radio access networks (RANs), for voice and data services. While a RAN and WCDs served by the RAN may communicate with one another via signaling channels in a substantially continuous fashion, the RAN may only allocate traffic channels to a WCD when that WCD or the RAN seeks to exchange voice, messaging, multimedia, or other forms of data. Thus, when a WCD is not actively transmitting or receiving voice, messaging, multimedia, or other forms of data, the WCD may relinquish traffic channels that it was allocated until the WCD once again needs to communicate with other devices.

Some RANs support primary and secondary paging channels through which a RAN can notify WCDs of incoming communications, such as voice calls and data sessions. These paging channels may be associated, in the sense that they may operate in a coordinated fashion to inform WCDs of these incoming communications, as well as traffic channel assignments. The RAN may organize the WCDs using the wireless coverage area into groups, and each group may be assigned the same time-division multiplexed (TDM) slots on these paging channels.

For instance, a RAN may utilize a slot of a low-bitrate secondary paging channel to transmit a first paging message to group of WCDs. The first paging message may indicate that at least one of the WCDs in the group will be paged with an upcoming second paging message that will occur in a slot of an associated, higher-bitrate primary paging channel. Preferably, each WCD in the group will then attempt to receive the second paging message in order to determine whether they are being paged.

In such a system, the TDM slots on the secondary paging channel may be significantly shorter than the TDM slots on the primary paging channel. This results in a WCD using more power when it listens to a TDM slot on the primary paging channel than when the WCD listens to a TDM slot on the secondary paging channel. Given that many WCDs are battery-powered mobile devices, it is desirable to their minimize power usage when possible, and thereby increase battery life.

OVERVIEW

In order to reduce WCD power consumption, a RAN may instruct WCDs that it serves to listen to a secondary paging channel. If the RAN transmits a paging message in a secondary paging channel slot, the WCDs in the group assigned to that slot may then listen to an upcoming associated slot on the primary paging channel. In this way, WCDs in the group may refrain from listening to the primary paging channel unless at least one WCD in the group is actually being paged. Thus, these WCDs may save battery life by using both the primary and secondary paging channels rather than just the primary paging channel.

However, if a given WCD in the group cannot receive paging messages properly on the secondary paging channel, this may lead to the RAN paging the given WCD several times. As a result, other WCDs in the group that can properly receive the paging messages transmitted on the secondary paging channel may listen to the upcoming associated slot on the primary paging channel, only to not be paged. Thus, these other WCDs may waste power by listening to the primary paging channel more frequently than they otherwise would. Therefore, it is desirable to be able to detect WCDs that cannot properly receive the secondary paging channel, and instruct these WCDs to listen only to the primary paging channel. Because the RAN won't send a paging message to such a WCD on the secondary paging channel, there will be fewer instances of other WCDs in the same group listening to the primary paging channel when they are not being paged.

Accordingly, in order to improve the efficiency of paging WCDs in wireless coverage areas that support associated primary and secondary channels, a RAN may employ the methods defined herein. In particular, the RAN may determine when a WCD has not been responding to paging messages transmitted on the secondary paging channel, and instruct that WCD to listen only to the primary paging channel. This, in turn, may increase the likelihood that the WCD is able to properly receive and respond to being paged.

Thus, in a preferred embodiment, a RAN may transmit a set of paging messages to a WCD via both the primary paging channel and the secondary paging channel. For example, this set may comprise one paging message on the secondary paging channel followed by an associated paging message on the primary paging channel. The RAN may determine that the WCD has not responded to at least some of the set of paging messages. In response to making this determination, the RAN may transmit a first command to the WCD to instruct the WCD to only receive paging messages on the primary paging channel. Thereafter, the RAN may transmit one or more of paging messages to the WCD via only the primary paging channel. In doing so, the RAN may avoid a situation in which the given WCD causes other WCDs in the same group to unnecessarily expend power and battery life. Nonetheless, the RAN may still page other WCDs in the same group on the secondary paging channel, as long as these other WCDs continue to respond sufficiently to being paged.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 1 depicts a communication system in accordance with a preferred embodiment;

FIG. 2B is a message flow diagram in accordance with a preferred embodiment;

FIG. 3 is a flow chart in accordance with a preferred embodiment;

DESCRIPTION

Figure 2A:
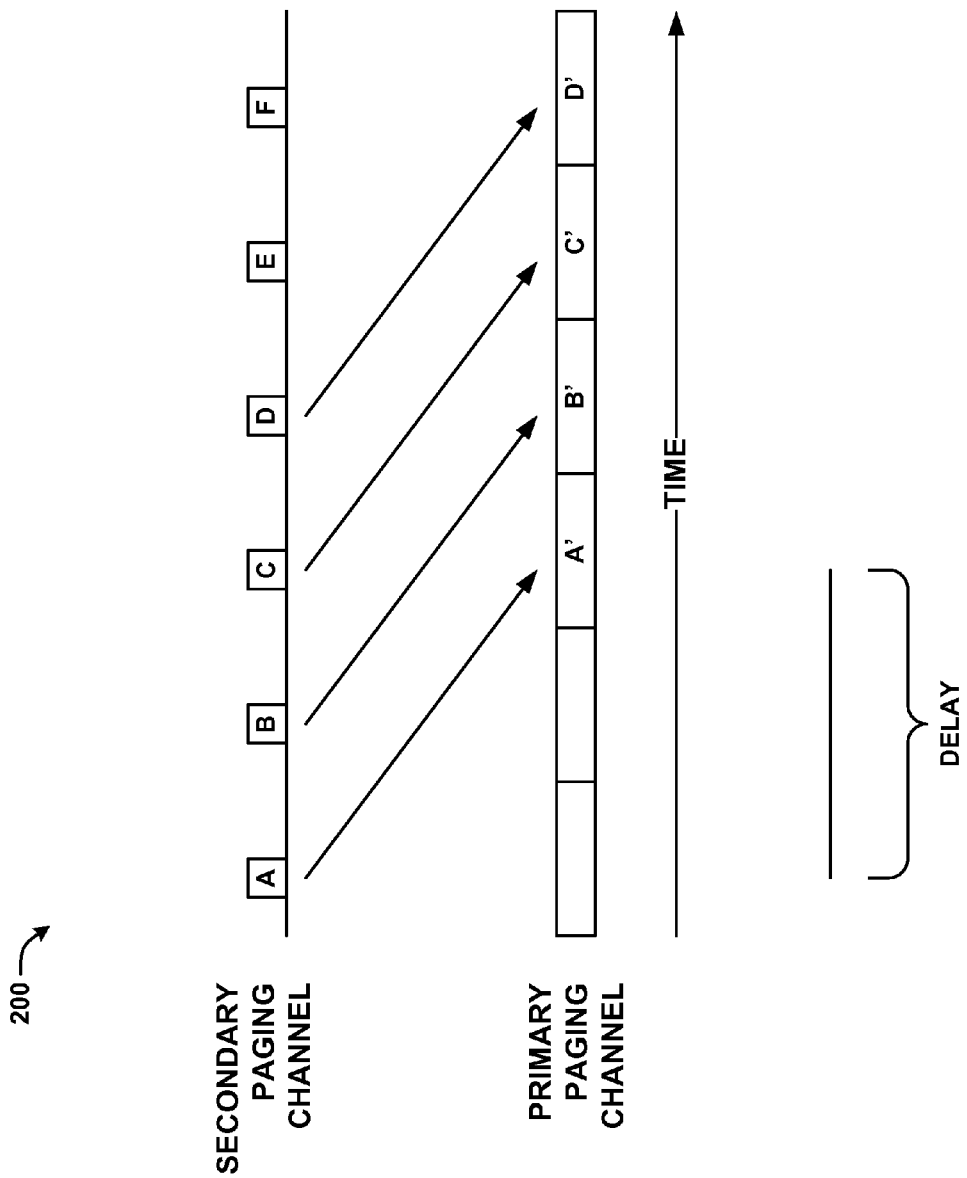
FIG. 2A is a timing diagram in accordance with a preferred embodiment.

Disclosed herein are methods and devices for efficient use of multiple paging channels. Preferably, a RAN uses both a primary paging channel and a secondary paging channel to page WCDs. If the RAN determines that a given WCD has not been responding to paging messages transmitted by the RAN on the secondary paging channel, the RAN may start using only the primary paging channel to page the WCD. To this end, the RAN may command the given WCD to stop listening to the secondary paging channel, and to listen only on the primary paging channel instead.

I. Network Architecture

FIG. 1 depicts an exemplary communication system 100. In communication system 100, RAN 105 includes a wireless coverage area 112 and base transceiver station (BTS) 120. Preferably BTS 120 radiates to define wireless coverage area 112. For purposes of illustration, only one BTS and one wireless coverage area is shown. However, more BTSs radiating to define more wireless coverage areas, or a single BTS radiating to define multiple wireless coverage areas, may be supported.

BTS 120 may be communicatively coupled to access node 130. Along with performing other tasks, access node 130 may manage the wireless resources associated with BTS 120, and route traffic to and from BTS 120. Alternatively, a radio network controller (RNC) or base station controller (BSC) may be used in place of access node 130, or may be integrated into or combined with either BTS 120 and/or access node 130. Regardless of the exact configuration, BTS 120 may be communicatively coupled to network 150 via router 135 and backhaul link 140.

Wireless coverage area 112 may provide air interface access to WCDs, such as WCD 110. In a preferred embodiment, BTS 120 generates signals on one or more forward link channels. These channels may be formed via a set of orthogonal Code Division Multiple Access (CDMA) Walsh codes, each of which may be used to modulate the data that BTS 120 transmits on a particular channel. The channels may include a pilot channel, over which a phase offset pattern is repeatedly transmitted, a sync channel over which synchronization data is transmitted, including a time reference available to BTS 120, and traffic channels over which the data directed to WCDs is transmitted. Additionally, one or more of the Walsh codes may be designated as primary and/or secondary paging channels.

The air interface of the wireless coverage areas may also include reverse link channels, which may also be formed through the use of CDMA, for transmitting data from a WCD to RAN 105. These reverse link channels may include, for example, an access channel for responding to paging messages, and reverse traffic channels. Thus, through the forward and reverse link channels, RAN 105 and WCDs may exchange signaling and bearer data.

A WCD in communication system 100, such as WCD 110, could be a wireless telephone, a wireless personal digital assistant, a wirelessly equipped laptop computer, a wireless router, or another type of mobile or fixed wireless device. Preferably, a WCD is a subscriber device that is manipulated by a human in order to establish circuit-switched or packet-switched voice and/or data calls. However, a WCD could also be an automated device without a human interface. A WCD may be associated with one or more BTSs at a time and may use the wireless coverage areas of these BTSs to communicate with correspondent nodes, such as web servers, gaming servers, short message service (SMS) servers, voice over IP (VoIP) signaling proxies, VoIP bearer gateways, and other WCDs.

It should be appreciated that the elements in FIG. 1 are exemplary, and embodiments of this invention may include more or fewer elements than in communication system 100, and the elements of communication system 100 may be arranged differently or omitted altogether. For example, there may be multiple routers that communicate with RAN 105, and each of these routers may have multiple backhaul links. Furthermore, elements of communication system 100 may comprise multiple physical or logical devices or components, or may be combined into fewer physical or logical components than are shown in FIG. 1. Moreover, a wireless coverage area may support tens, hundreds, or thousands of WCDs. Additionally, each wireless coverage area may support multiple primary and secondary paging channels.

Additionally, WCD 110, wireless coverage area 112, BTS 120, and access node 130, may operate in accordance to various types of wireless protocols, such as CDMA, Worldwide Interoperability for Microwave Access (WIMAX®), Universal Mobile Telecommunications System (UMTS®), Long Term Evolution (LTE®), IDEN®, 802.11 (Wifi), or other protocols now known or later developed. Thus, the "primary paging channel" herein could refer to a CDMA paging channel (PCH) or UMTS® paging channel (also abbreviated as PCH), and the "secondary paging channel" herein could refer to a CDMA quick paging channel (QPCH) or a UMTS® paging indicator channel (PICH).

II. Paging Channel Operation

In one embodiment, WCD 110 is in one of at least two states while using wireless coverage area 112. WCD 110 may be "active," in the sense that WCD 110 is allocated a traffic channel with which to communicate bearer data with correspondent nodes. On the other hand, WCD 110 may be "idle," in the sense that WCD 110 is not allocated a traffic channel. It is preferable for WCD 110 to be idle when WCD 110 is not actively communicating with correspondent nodes. This way, channel resources, as well as the battery life of WCD 110, may be conserved.

When RAN 105 seeks to communicate with WCD 110 (e.g., to establish an incoming voice call or transmit incoming packet data) when WCD 110 is idle, RAN 105 may first page WCD 110. The purpose of paging WCD 110 is to determine whether WCD 110 is still within range of wireless coverage area 112, and if so, notify WCD 110 of the incoming communication. If WCD 110 is successfully paged, RAN 105 may assign one or more traffic channels to WCD 110.

Preferably, there are at least two modes of paging channel operation supported by RAN 105. In single-channel paging mode, RAN 105 supports paging any given WCD using only a single paging channel. In dual-channel paging mode, RAN 105 supports paging the given WCD using two paging channels. Each of these modes is described in more detail below.

a. Single-Channel Paging Mode

In single-channel paging mode, paging WCD 110 may involve RAN 105 transmitting one or more page-request messages on a primary paging channel to WCD 110. Preferably, the primary paging channel comprises one or more of the forward links supported by wireless coverage area 112. Once WCD 110 receives such a page-request message, WCD 110 typically will reply with a page-response message. After receiving the page-response message, RAN 105 may assign one or more traffic channels to WCD 110.

The primary paging channel may operate in a slotted manner, according to TDM, and multiple WCDs may be grouped together and assigned to the same primary paging channel slot. During such a slot, RAN 105 preferably transmits information sufficient to identify which WCD or WCDs of the group (if any) are being paged. Thus, each of these multiple WCDs may periodically listen to their assigned primary paging channel slot to determine whether RAN 105 is seeking to page them.

A WCD, such as WCD 110, may check its assigned primary paging channel slot once every few seconds and receive information from the primary paging channel for the duration of the slot. These slot durations may be on the order of 80 milliseconds, and each slot may contain several hundred bits or more. For example, in some CDMA systems, WCDs may be configured to check their assigned primary paging channel slot for 80 milliseconds every 1.28, 2.56, or 5.12 seconds. However, these WCDs often perform this check of the primary paging channel whether or not they are actually being paged. In fact, it is likely that for the vast majority of the primary paging channel slots assigned to a given WCD, the given WCD will not be paged.

It should be understood that referring to a WCD "checking" or "listening to" a paging channel includes any means with which a WCD may receive information on the paging channel. This may include, but is not limited to, obtaining a modulated electromagnetic signal, on one or more carrier frequencies, representing digital information.

In order to receive such information, a WCD expends power. For instance, the WCD powers its receiver hardware so that the WCD can receive the incoming signal from RAN 105. Additionally, the WCD may process the incoming signal in order to decode this signal into a digital representation. Then, the WCD may interpret the digital representation to determine whether the WCD is being paged. Thus, this process of frequently checking the primary paging channel can have detrimental effect on the battery life of the WCD, even if the WCD is not actively using a traffic channel.

While it may be feasible to reduce the frequency at which a WCD checks the primary paging channel, doing so may deleteriously impact session establishment latency. Suppose, for instance, WCD 110 checks the primary paging channel once every 10 seconds. Then, if RAN 105 pages WCD 110 to establish a communication session, there will be, on average, a delay of 5 seconds before WCD is able to receive the first page-request message. This may result in a dramatic reduction of quality for latency-sensitive real-time sessions, such as VoIP or push-to-talk (PTT) sessions.

b. Dual-Channel Paging Mode

In order to reduce the battery consumption of idle WCDs without introducing additional session establishment latency, a secondary paging channel (e.g., a CDMA QPCH or a UMTS® PICH) may be deployed. A secondary paging channel may be associated with a primary paging channel, and may work in conjunction with the primary paging channel. In particular, the secondary paging channel may also operate in a slotted fashion and according to TDM. Preferably, each secondary paging channel slot corresponds to a future slot on the primary paging channel.

Similar to single-channel paging mode, in dual-channel paging mode, the RAN may assign a group of one or more WCDs to each associated pair of primary paging channel and secondary paging channel slots. Each WCD in the group initially listens to only the assigned secondary paging channel slots. When the RAN determines that it will page a WCD in such a group, the RAN first transmits a paging message during the group's assigned secondary paging channel slot. This paging message informs the group that at least one WCD in the group will be paged during the associated primary paging channel slot. Then, each WCD in the group listens to the associated primary paging channel slot, in which the RAN will transmit a page-request message. The WCD or WCDs that were paged then may respond appropriately to the page-request message, while the WCD or WCDs that were not paged may return to listening only to the secondary paging channel.

Preferably, secondary paging channel slots are much shorter (e.g., on the order to a few milliseconds or less) than primary paging channel slots. Secondary paging channel slots may be as little as one bit in length, whereas primary paging channel slots may be several hundred bits in length. Therefore, listening to a secondary paging channel may require far less power than listening to the primary paging channel, because each WCD needs to receive and process fewer bits per paging channel slot.

FIG. 2A illustrates secondary paging channel and primary paging channel operation in timing diagram 200. In particular, slots on a secondary paging channel and a primary paging channel are illustrated. For instance, timing diagram 200 depicts slots A, B, C, D, E, and F on the secondary paging channel. Preferably each of these slots contains one or more bits and is capable of informing one or more WCDs that these WCDs should listen on the primary paging channel during a respective associated slot. Timing diagram 200 also depicts slots A', B', C', D', E', and F' on the primary paging channel. These slots are associated with the slots on the secondary paging channel. For example, secondary paging channel slot A may be associated with slot primary paging channel A', slot secondary paging channel B may be associated with primary paging channel slot B' and so on.

Preferably, there is a fixed offset, or delay, between a secondary paging channel slot and its associated primary paging channel slot. Thus, for instance, primary paging channel slot A' may occur a particular period of time after secondary paging channel slot A, and primary paging channel B' may occur the same period of time after secondary paging channel slot B. In some embodiments, this delay may be on the order of 100 milliseconds, but other delays values are possible.

The delay between secondary paging channel slots and their associated primary paging channel slots need not be fixed—instead this delay may vary. Any delay sufficient to allow a WCD to receive information in a secondary paging channel slot and then tune, or switch, to the primary paging channel to receive information in the associated primary paging channel slot may be sufficient.

Despite use of a secondary paging channel being an effective way of improving battery life in WCDs, deploying a secondary paging channel in a wireless coverage area can also lead to additional problems that may actually reduce battery life. In particular, some WCDs may have difficulty accurately receiving the information in a secondary paging channel slot. Assuming for sake of simplicity that secondary paging channel slots are one bit in duration, a WCD may need to be precisely configured to be able to accurately determine the contents of the slot. For instance, a mis-configured WCD may interpret a zero on the secondary paging channel to be a one or vice versa. In fact, a WCD need not be mis-configured to exhibit such an error. Instead, the WCD may have faulty hardware, or may not be receiving the secondary paging channel at a sufficient level of power to accurately determine the contents of the slot. Regardless of the actual cause of these problems, WCD errors when receiving on the secondary paging channel can be categorized into two broad classes: false positives and false negatives.

A false positive occurs when the RAN transmits a zero in a secondary paging channel slot, but a WCD interprets this zero to be a one. The WCD may then listen to the corresponding slot on the primary paging channel. However, the RAN is not actually paging the WCD, so the WCD wastes power and battery life by listening to the primary paging channel.

A false negative occurs when the RAN transmits a one in a secondary paging channel slot, but a WCD interprets this one to be a zero. Instead of then listening to the primary paging channel, the WCD remains idle, waiting until its next assigned secondary paging channel slot. If the WCD is not actually being paged by the RAN, no harm is done. However, if the WCD is being paged by the RAN, it will not receive the page-request message. Moreover, other WCDs in the same group may listen to the corresponding slot on the primary paging channel, thus wasting power and battery life if they are not being paged as well. Since a RAN may attempt to page the WCD several times before giving up, this process may repeat, wasting even more power and battery life of other WCDs.

The number of WCDs assigned to a group, and therefore potentially negatively impacted by a WCD suffering from false negatives, can be in the dozens or more. Further, if more than one WCD in a group suffers from false negatives, the other WCDs in the group will consume battery power at an even greater rate. Therefore, it would be advantageous to make improvements to the RAN so that the RAN can attempt to avoid situations in which WCDs are failing to receive information properly on a secondary paging channel.

c. Improving WCD Battery Life through Modifications to Secondary Paging Channel Usage FIG. 2B provides a high-level message flow diagram 250 of a method with which a RAN may mitigate the impact of false positive and false negative responses to paging messages experienced by a WCD when the WCD listens to a secondary paging channel slot. In particular, RAN 105 may determine that WCD 110 has not responded to one or more paging messages on the secondary paging channel, and then command WCD 110 to thereafter use only the primary paging channel. While doing so may cause WCD 110 to use more power than if WCD 110 uses both paging channels, other WCDs in the same group as WCD 110 are less likely to waste power due to WCD 110 registering false negatives.

Other network elements can be involved in these transactions without departing from the scope of these embodiments. Furthermore, this embodiment depicts a sequence of steps occurring between a RAN and a WCD, but the steps may occur in a different order, and fewer or more steps may be used without departing from the scope of this embodiment.

At step 255, RAN 105 may transmit a paging message to WCD 110 in a secondary paging channel slot. The secondary paging channel may be, for example, a QPCH or PICH. Preferably this paging message instructs WCD 110 to listen in a corresponding primary paging channel slot. Then, at step 260, RAN 105 may transmit a page-request message to WCD 110 in the corresponding primary paging channel slot. However, for any one of the reasons discussed above, or for other reasons altogether, WCD 110 may not have properly received the paging message in that was transmitted at step 255. Therefore, WCD 110 may not properly receive or respond to the page-request message.

Thus, at step 265, RAN 105 may determine that WCD 110 has not responded to being paged. This determination can take various forms. In one example, RAN 105 may determine that WCD 110 has not responded to a threshold number of consecutive paging attempts, where each paging attempt may involve RAN 105 transmitting a paging message to the WCD on the secondary paging channel and then another paging message on the primary paging channel. This threshold number may be a configurable parameter set by an operator and/or set in a default RAN configuration. RAN 105 preferably counts the number of consecutive paging messages to which WCD 110 does not respond, and when this count reaches the threshold, RAN 105 may determine that WCD 110 has not responded to being paged.

In another example, RAN 105 may determine that WCD 110 has not responded to a threshold number of paging messages out of a set of paging messages that RAN 105 transmitted to WCD 110. Again, this threshold number may be a configurable parameter set by an operator and/or set in a default RAN configuration, and RAN 105 preferably counts the number of paging messages to which WCD 110 does not respond. If this number exceeds the threshold, RAN 105 may determine that WCD 110 has not responded to being paged. When counting the paging messages, the RAN preferably includes only paging messages transmitted on the primary paging channel, since WCD may not respond directly to paging messages transmitted on the secondary paging channel.

In yet another example, RAN 105 may maintain a threshold page success rate for WCD 110. Preferably, this page success rate is represented as a real number or fraction between zero and one, inclusive, or a percentage between 0% and 100%, inclusive. Then, if out of a set of one or more paging messages transmitted to WCD 110, if the percent or fraction of paging messages WCD 110 responds to is less than the page success rate, RAN 105 may determine that WCD 110 has not responded to being paged.

Regardless of how RAN 105 makes this determination, at step 270, RAN 105 may transmit a command to WCD 110. Preferably this command instructs WCD 110 to only use the primary paging channel. This command may take one or more of many possible forms. For instance, the command may be delivered via a short messaging service (SMS) or a multimedia messaging service (MMS). Alternatively, other signaling channels including but not limited to various types of pilot channels, synchronization channels, paging channels, or other overhead channels may be used to deliver the command. Regardless of the type of channel used, the command preferably indicates that WCD 110 should stop listening to the secondary paging channel, and instead only listen to the primary paging channel.

Therefore, after receiving the command, WCD 110 may begin listening for paging messages only on the primary paging channel. In doing so, WCD 110 may avoid missing page-request messages due to any problem WCD 110 may have receiving on the secondary paging channel. After transmitting this command, RAN 105 may stop transmitting paging messages for WCD 110 on the secondary paging channel, and instead only page WCD 110 on the primary paging channel. In other words, RAN 105 may still page other WCDs in the same group as WCD 110 on the secondary paging channel, but when RAN 105 pages WCD 110, the RAN will only page WCD 110 on the primary paging channel. Accordingly, at step 275, RAN 105 pages WCD 110 on the primary paging channel without first paging WCD 110 on the secondary paging channel.

It should be understood that RAN 105 may attempt to page WCD 110 using both the secondary paging channel and the primary paging channel several times before determining that WCD 110 should only be paged on the primary paging channel. In other words, steps 255 and 260 may occur more than once before step 265 occurs.

Additionally, after RAN 105 determines that WCD 110 should only be paged on the primary paging channel, RAN 105 may later revert to again paging WCD 110 on both paging channels. This option may be particularly useful if WCD 110 was not receiving the secondary paging channel properly because WCD 110 was experiencing interference, distortion, or attenuation on the secondary paging channel. In such a situation, WCD 110 may once again be able to receive the secondary paging channel properly if this interference, distortion, or attenuation subsides. For example, WCD 110 may move to a physical location with better wireless coverage, and thus be able to receive the secondary paging channel with a greater degree of accuracy. Therefore, by reverting to using both paging channels after a period of time, WCD 110 may once again be able to take advantage of the potential advantages, in terms of power efficiency, associated with the secondary paging channel.

The duration of this period of time may be included in the command transmitted to WCD 110 at step 270. Alternatively, this duration may be negotiated between RAN 105 and WCD 110, or pre-determined and therefore known by both RAN 105 and WCD 110. In another alternative, RAN 105 may transmit a second command to WCD 110, this command instructing WCD 110 to once again start listening to both the secondary paging channel and the primary paging channel. Accordingly, after receiving the command, WCD 110 may once again begin listening for paging messages on both paging channels. Further, after transmitting this command, RAN 105 may once again transmit paging messages to WCD 110 on the secondary paging channel.

Additionally, RAN 105 may, either by default or by operator configuration, instruct WCD 110 to listen to both paging channels after WCD 110 is handed off into a new wireless coverage area. In this way, WCD 110 is given an opportunity to be able to properly receive paging messages on the secondary paging channel of the new wireless coverage area. If RAN 105 later determines that WCD 110 is not properly receiving the paging messages in the new wireless coverage area, RAN 105 may instruct WCD 110 to only use the primary paging channel in the new wireless coverage area.

FIG. 3 further illustrates this embodiment in the form of flow chart 300. At step 305, a RAN transmits a set of paging messages to a WCD via both a primary paging channel and a secondary paging channel. The set of paging messages may include an initial paging message that the RAN transmits to the WCD on the secondary paging channel, and a subsequent paging message that the RAN transmits to the WCD on the primary paging channel.

At step 310, the RAN determines that the WCD has not responded to at least some of the set of paging messages. Preferably, the WCD does not respond directly to paging messages on the secondary paging channel, as paging messages on the secondary paging channel typically inform the WCD to expect a subsequent paging message on the primary paging channel. Thus, for instance, the RAN may determine that the WCD has not responded to one or more paging messages of the set that were transmitted on the primary paging channel.

Then, at step 315, in response to this determination, the RAN transmits a first command to the WCD to instruct the WCD to only receive paging messages on the primary paging channel. Thereafter, the RAN transmits one or more of paging messages to the WCD via only the primary paging channel.

In order to determine whether to transmit paging messages on just the primary paging channel or both the primary and secondary paging channels, the RAN may maintain a categorization of which WCDs are capable of receiving paging messages on both the primary paging channel and the secondary paging channel. Thus, for example, before transmitting the set of paging messages to the WCD at step 305, the RAN may categorize the WCD as capable of receiving paging messages on both the primary paging channel and the secondary paging channel. Then, in response to determining that the WCD has not responded to the at least some of the set of paging messages at step 310, the RAN may categorize the WCD as capable of receiving paging messages only on the primary paging channel.

At some point after categorizing the WCD as capable of receiving paging messages only on the primary paging channel, the RAN may re-categorize the WCD as capable of receiving paging messages on both the primary paging channel and the secondary paging channel. Accordingly, the RAN may transmit a second command to the WCD to instruct the WCD to receive paging messages on both the primary paging channel and the secondary paging channel, and thereafter transmit a third set of paging messages to the WCD via both the primary paging channel and the secondary paging channel.

Figure 4:
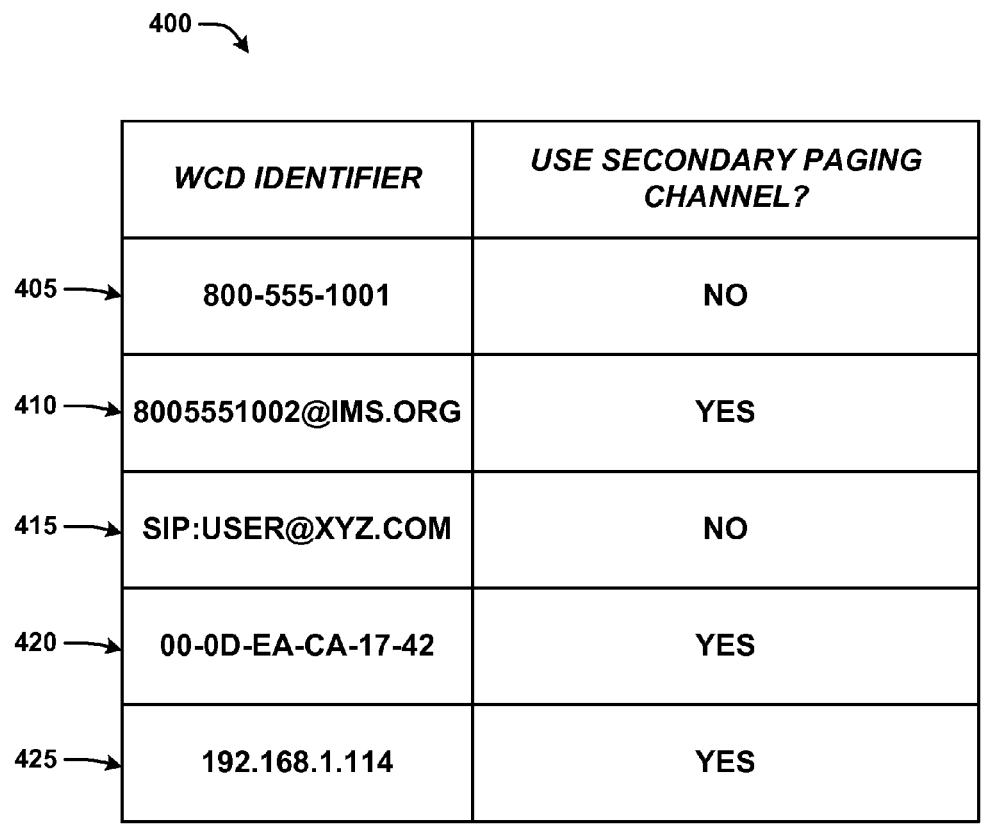
FIG. 4 depicts categorized WCDs in accordance with a preferred embodiment.

FIG. 4 illustrates table 400 for categorizing WCDs served by the RAN. Preferably, table 400 is stored within or accessible to the RAN. Table 400 may be arranged in two columns, one containing identifiers of WCDs, the other containing an indication of whether the RAN will use the secondary paging channel when paging the respective WCD. Thus, for example, entry 405 indicates that the RAN will not use the secondary paging channel to page a WCD having phone number 800-555-1001. On the other hand, entry 410 indicates that the RAN will use the secondary paging channel to page a WCD having a network address identifier (NAI) or email address of 8005551002@IMS.ORG. Entry 415 indicates that the RAN will not use the secondary paging channel to page a WCD having a Session Initiation Protocol (SIP) uniform resource message (URI) of SIP:USER@XYZ.COM, while entries 420 and 425 indicate that the RAN will use the secondary paging channel to page WCDs with the hardware address 00-0D-EA-CA-17-42 and the IP address 192.168.1.114, respectively.

Thus, a RAN with access to a categorization of WCDs may perform the following procedures when paging a WCD. The RAN may determine that the given WCD should be paged, and may acquire an identifier of the given WCD. Then, the RAN may look up this identifier in the categorization (e.g., a table like table 400), to determine whether the RAN should use a secondary paging channel when paging the given WCD. If the categorization indicates that the RAN should use the secondary paging channel, then the RAN may transmit paging messages to the given WCD first on the secondary paging channel and then on the primary paging channel. On the other hand, if the categorization indicates that the RAN should not use the secondary paging channel, then the RAN may transmit paging messages to the given WCD on only the primary paging channel.

While table 400 provides several example entries that may be stored at or accessible to the RAN, the scope of this invention is not limited by these examples. Thus, different types of WCD identifiers may be used. Additionally, whether the RAN will page any given WCD using just the primary paging channel or both paging channels could be represented in different ways. Furthermore, table 400 may store many more entries than shown in FIG. 4. Moreover, other representations aside from that of a table may be possible.

III. RAN Component Embodiment

Figure 5:
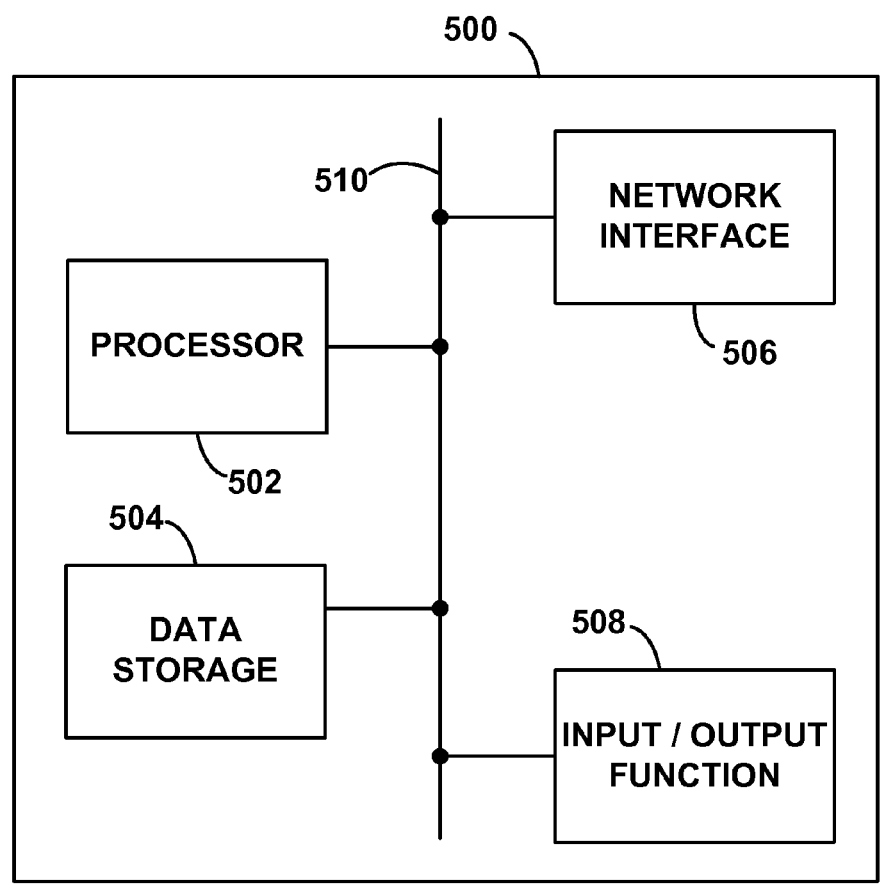
FIG. 5 is a block diagram of a RAN component in accordance with a preferred embodiment.

FIG. 5 is a simplified block diagram exemplifying a RAN component 500, and illustrating some of the functional components that would likely be found in a RAN component arranged to operate in accordance with the embodiments herein. Example RAN component 500 could be any type of RAN component, such as a BTS, BSC, RNC, or access node, that instructs WCDs to use paging channels or transmits paging messages to WCDs.

Example RAN component 500 preferably includes a processor 502, a data storage 504, a network interface 506, and an input/output function 508, all of which may be coupled by a system bus 510 or a similar mechanism. Processor 502 preferably includes one or more CPUs, such as one or more general purpose processors and/or one or more dedicated processors (e.g., application specific integrated circuits (ASICs) or digital signal processors (DSPs), etc.) Data storage 504, in turn, may comprise volatile and/or non-volatile data storage and can be integrated in whole or in part with processor 502.

Data storage 504 preferably holds program instructions executable by processor 502, and data that is manipulated by these instructions, to carry out the various methods, processes, or functions described herein. (Alternatively, these methods, processes, or functions can be defined by hardware, firmware, and/or any combination of hardware, firmware and software.)

Network interface 506 may take the form of a wireline connection, such as an Ethernet, Token Ring, or T-carrier connection. Network interface 506 may also take the form of a wireless connection, such as IEEE 802.11 (Wifi), BLUETOOTH®, or a wide-area wireless connection. However, other forms of physical layer connections and other types of standard or proprietary communication protocols may be used over network interface 506. Furthermore, network interface 506 may comprise multiple physical interfaces.

Input/output function 508 facilitates user interaction with example RAN component 500. Input/output function 508 may comprise multiple types of input devices, such as a keyboard, a mouse, a touch screen, and so on. Similarly, input/output function 508 may comprise multiple types of output devices, such as a monitor, printer, or one or more light emitting diodes (LEDs). Additionally or alternatively, example RAN component 500 may support remote access from another device, via network interface 506 or via another interface (not shown), such an RS-232 port.

By way of example, the data in data storage 504 may include one or more tables representing whether example RAN component 500 is to page a given WCD using just the primary paging channel or on both the primary and the secondary paging channel. Furthermore, data storage 504 may contain program instructions executable by processor 502 to carry out any of the methods, processes, or functions disclosed in this specification or the accompanying drawings.

IV. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method comprising:
a radio access network (RAN) transmitting a set of paging messages to a wireless communication device (WCD) via a primary paging channel and a secondary paging channel, both of a wireless coverage area, wherein the RAN maintains a page success rate for the WCD;
based on the page success rate, determining that the WCD has not responded to at least one of the set of paging messages;
in response to determining that the WCD has not responded to the at least one of the set of paging messages, the RAN (i) transmitting a first command to the WCD to instruct the WCD to refrain from using the secondary paging channel while the WCD is associated with the wireless coverage area, and (ii) while the WCD is associated with the wireless coverage area, transmitting one or more paging messages to the WCD via only the primary paging channel;
detecting a handoff of the WCD to a new wireless coverage area of the RAN; and
in response to detecting the handoff, (i) transmitting a second command to the WCD to instruct the WCD to use both the primary paging channel and the secondary paging channel, and (ii) thereafter, transmitting two or more paging messages to the WCD via the primary paging channel and the secondary paging channel.

2. The method of claim 1, wherein the secondary paging channel comprises one of a quick paging channel (QPCH) and a paging indicator channel (PICH).

3. The method of claim 1, wherein determining that the WCD has not responded to the at least one of the set of paging messages comprises determining that the WCD has not responded to a threshold number of consecutive paging messages from the set.

4. The method of claim 1, wherein determining that the WCD has not responded to the at least one of the set of paging messages comprises determining that the WCD has not responded to a threshold number of paging messages out of all paging messages from the set.

5. The method of claim 1, wherein transmitting the first command to the WCD comprises transmitting the first command to the WCD using a short message service (SMS) message.

6. The method of claim 1, wherein transmitting the first command to the WCD comprises transmitting the first command to the WCD using a signaling message.

7. The method of claim 1, wherein the set of paging messages comprises an initial paging message and a subsequent paging message, and wherein the RAN transmitting the set of paging messages to the WCD comprises:
the RAN transmitting the initial paging message to the WCD on the secondary paging channel; and
after transmitting the initial paging message, the RAN transmitting the subsequent paging message to the WCD on the primary paging channel.

8. The method of claim 1, further comprising:
before transmitting the set of paging messages to the WCD, the RAN categorizing the WCD as configured to receive paging messages on both the primary paging channel and the secondary paging channel.

9. The method of claim 8, further comprising:
in response to determining that the WCD has not responded to the at least one of the set of paging messages, the RAN categorizing the WCD as configured to receive paging messages only on the primary paging channel.

10. The method of claim 9, wherein the RAN maintains a table of WCDs, each entry in the table (i) identifying a given WCD, and (ii) indicating whether the given WCD is configured to receive paging messages on the secondary paging channel, and wherein the RAN categorizing the WCD as configured to receive paging messages only on the primary paging channel comprises the RAN updating an entry associated with the WCD to indicate that the WCD is not configured to receive paging messages on the secondary paging channel.

11. A radio access network (RAN) that radiates to define a wireless coverage area, wherein the RAN supports a primary paging channel and a secondary paging channel via the wireless coverage area, the RAN comprising:
a processor;
a data storage; and program instructions, stored in the data storage and executable by the processor, to (i) transmit a set of paging messages to a wireless communication device (WCD) via both the primary paging channel and the secondary paging channel, wherein the RAN maintains a page success rate for the WCD, (ii) based on the page success rate, determine that the WCD has not responded to at least one of the set of paging messages, and (iii) in response to determining that the WCD has not responded to the at least one of the set of paging messages, transmitting a first command to the WCD to instruct the WCD to refrain from using the secondary paging channel while the WCD is associated with the wireless coverage area, while the WCD is associated with the wireless coverage area, transmitting one or more paging messages to the WCD via only the primary paging channel, (iv) detecting a handoff of the WCD to a new wireless coverage area of the RAN, and (v) in response to detecting the handoff, transmitting a second command to the WCD to instruct the WCD to use both the primary paging channel and the secondary paging channel, and thereafter, transmitting two or more paging messages to the WCD via the primary paging channel and the secondary paging channel.

12. The RAN of claim 11, wherein determining that the WCD has not responded to the at least one of the set of paging messages comprises determining that the WCD has not responded to a threshold number of consecutive paging messages from the set.

13. The RAN of claim 11, wherein determining that the WCD has not responded to the at least one of the set of paging messages comprises determining that the WCD has not responded to a threshold number of paging messages out of all paging messages from the set.

14. The RAN of claim 11, wherein transmitting the first command to the WCD comprises transmitting the first command to the WCD using one of a short message service (SMS) message and a signaling message.

15. The RAN of claim 11, further comprising:
program instructions, stored in the data storage and executable by the processor, to, before transmitting the set of paging messages to the WCD, categorize the WCD as configured to receive paging messages on both the primary paging channel and the secondary paging channel; and
program instructions, stored in the data storage and executable by the processor, to, in response to determining that the WCD has not responded to the at least one of the set of paging messages, categorize the WCD as configured to receive paging messages only on the primary paging channel.

16. The RAN of claim 15, wherein the data storage contains a table of WCDs, each entry in the table (i) identifying a given WCD, and (ii) indicating whether the given WCD is configured to receive paging messages on the secondary paging channel, and wherein categorizing the WCD as configured to receive paging messages only on the primary paging channel comprises updating an entry associated with the WCD to indicate that the WCD is not configured to receive paging messages on the secondary paging channel.

* * * * *